United States Patent [19]

Nakagaki

[11] Patent Number: 5,062,780
[45] Date of Patent: Nov. 5, 1991

[54] VULCANIZATION APPARATUS

[75] Inventor: Toshio Nakagaki, Kobe, Japan

[73] Assignee: Bando Kabushiki Kaisha d/b/a Bando Chemical Industries, Ltd., Kobe, Japan

[21] Appl. No.: 592,844

[22] Filed: Oct. 4, 1990

[30] Foreign Application Priority Data

Oct. 31, 1989 [JP] Japan .................................. 1-285482

[51] Int. Cl.⁵ ...................... B29C 43/12; B29C 33/02; B29C 33/34; B29C 35/02
[52] U.S. Cl. ..................................... 425/39; 425/182; 425/389
[58] Field of Search .................. 264/313; 425/39, 28.1, 425/389, 182

[56] References Cited

U.S. PATENT DOCUMENTS

| | | | |
|---|---|---|---|
| 2,446,620 | 8/1948 | Swallow et al. | 425/389 |
| 3,061,873 | 11/1962 | Supitilov et al. | 425/389 |
| 3,398,218 | 8/1968 | Richmond | 425/39 |
| 4,095,480 | 6/1978 | Schwabauer | 264/313 |
| 4,604,252 | 8/1986 | Stigler | 264/313 |
| 4,890,542 | 1/1990 | Miller et al. | 92/193 |

Primary Examiner—Willard Hoag
Attorney, Agent, or Firm—Marshall, O'Toole, Gerstein, Murray & Bicknell

[57] ABSTRACT

Vulcanization apparatus to vulcanize, with the heat and pressure of a fluid, a molding of rubber belt material (before being cut crosswise into the final products) while the molding is being held intact over the external circumference of a hollow cylindrical mold. A steaming jacket is provided into which the mold with the molding sticking intact thereto is inserted. The steaming jacket comprises a rubber sleeve on the interior of a cylindrical casing and secured and sealed at upper and lower axial ends of the rubber sleeve against the casing. The sleeve is swelled inwardly when heated high pressure fluid is passed through an internal space between the casing and the sleeve. The vulcanization apparatus is provided with steam supply and discharge pipes for the internal space of the jacket and steam supply and discharge pipes for the mold inserted into the jacket.

2 Claims, 3 Drawing Sheets

VULCANIZATION APPARATUS

FIELD AND BACKGROUND OF THE INVENTION

The present invention relates to a vulcanization apparatus for cylindrical rubber moldings.

A vulcanizer is a part of the typical conventional vulcanization apparatus. In a known type of vulcanizer, rubber moldings are placed inside a vulcanization vessel, and then high temperature and high pressure steam is introduced into the vessel to effect vulcanization.

FIG. 3 illustrates a prior art apparatus for vulcanizing a cylindrical rubber molding 61, such as a belt material prior to being cut crosswise into final belt products, including a vulcanizer vessel 50. When the molding 61 is completely molded over the external circumference of a hollow cylindrical mold 62, flanges 63 and 64 are mounted, as illustrated, on both ends of the mold 62, and then a rubber sleeve 65 is placed over the assembly. Thus the sleeve 65 covers the flanges 63 and 64 and the molding 61. Then the molding 61 in this state is placed on a table 51 inside the vulcanizer vessel 50. High temperature steam is then introduced from a steam pipe (feed pipe) 52, and high temperature and high pressure steam is introduced from a steam pipe (feed pipe) 54, while steam-liquid is drained and recovered from steam pipes (discharge pipes) 53 and 55. The molding 61 is heated by the steam through thermal conduction via the circumferential walls of the mold 62 and the sleeve 65, and at the same time, the molding 61 is pressed against the external circumference of the mold 62 by the sleeve 65; thus the entire molding 61 is vulcanized at once.

In the vulcanization system using the foregoing vulcanizer, the reason for placing a rubber sleeve 65 over the external circumference of a molding is to prevent steam from directly contacting the molding. In the conventional system as mentioned above (see FIG. 3), the success or failure of vulcanization depends solely on the closeness of contact between the rubber sleeve 65 and the flanges 63, 64, and there is a high risk of contact between steam and the molding. If dirt particles are caught when the sleeve 65 is being placed over the flanges, or if the elasticity of the sleeve is reduced after repeated use, the close contact between the sleeve and the flanges will be defective, and steam will penetrate through a gap thus generated. If steam penetrates into the sleeve and contacts the molding, sulfur, etc. from the molding might be present in the drain steam-liquid to be recovered, and in turn might corrode or damage the steam generator (such as a boiler). Furthermore, the molding will suffer adverse effects due to exposure to steam, in physical properties of the rubber, adhesion of the rubber and composite materials (such as cords in the belt).

For rubber moldings with a larger circumference, in addition to the aforementioned system with the vulcanizer, other vulcanization systems are also available wherein moldings are placed across a pair of pulleys and moved longitudinally in sequence to achieve heating and pressurization (e.g. continuous vulcanization systems such as the press type and rotary curing press). Such systems, however, are troublesome in that unvulcanized moldings of low strength must be removed from molds and placed across the press, and it takes a long time to vulcanize the whole circumference. Moreover, such systems are hardly applicable to moldings with shorter circumference (such as those used to form fan belt materials for vehicles).

SUMMARY OF THE INVENTION

The objective of the present invention is to provide a vulcanization apparatus that does not require removal of a cylindrical rubber molding from the mold. Moreover, the apparatus is capable of vulcanizing the entire circumference of the molding at once, and steam, which is the heating and pressurizing medium, does not contact the molding (thus the integrity of the steam generator and the molding is not adversely affected).

To vulcanize a cylindrical rubber molding formed over the external circumference of a hollow mold, the apparatus according to the present invention is provided with (a) a jacket wherein a rubber sleeve is mounted inside a cylindrical casing, with both axial ends of the sleeve being fixed and sealed to the casing, the jacket being dimensioned in such a way that when the sleeve and the casing are in close contact with each other, a molding sticking intact to the external circumference of the mold can be inserted into the sleeve, and when the internal space between the casing and the sleeve is pressurized, the sleeve is swelled inwardly and the molding is pressed by the inner circumference of the sleeve; (b) pipes connected to the jacket to pass high temperature and high pressure fluid through the internal space; and (c) pipes connected to the mold to pass high temperature fluid through the hollow interior thereof. Since the fluids are for vulcanization of rubber moldings, high temperature is meant to be from about 150° to 200° C., and high pressure from about 9 to 15 kg/cm$^2$.

The vulcanization apparatus according to the present invention, in the same manner as the vulcanizer system as illustrated in FIG. 3, vulcanizes a molding sticking to the external circumference of a hollow mold for molding by means of a fluid (such as steam) as a heat source as well as a pressure source. The rubber molding is heated, over the external circumference of the mold, by the heat of the high temperature fluid passing from the piping (part (c) above) through the mold. On the other hand, the rubber molding is also heated and pressurized by the heat and pressure of the high temperature and high pressure fluid passing from the piping (part (b) above) into the jacket (a). The heat of the fluid is transferred by thermal conduction through the circumferential walls of the mold and the rubber sleeve to the molding, and the pressure is transmitted, as described in connection with (a) above, via the rubber sleeve to the molding. Said rubber sleeve is swelled inwardly to press the molding when the rubber sleeve is pressurized. The aforementioned operations are carried out without removing the molding from the mold, and on the entire circumference of the mold at once.

One feature of the apparatus is that, as described in connection with (a) above, a rubber sleeve is fixed and sealed to the interior of a cylindrical casing to form a jacket, and a fluid is passed through the interior space of the jacket and the hollow of the mold. The sleeve is fixed to the interior of the casing, without being fixed to or removed from the casing for each vulcanization process. Hence there is no chance of inclusion of dirt between the sleeve and the casing, and the condition of close contact between them is stable and is maintained over a long period. As a result, the jacket is free of leakage of the fluid or exposure of the molding to the fluid, provided that the connections between the piping and the jacket and between the piping (c) and the
[...] are secure (this can be accomplished with ease by
[mea]ns of ordinary joints with packings, etc.).

As described above, in the present apparatus, the
operation of placing a rubber sleeve over a molding is not required. Furthermore, when the sleeve and the casing are allowed to closely contact each other by not passing the fluid through the jacket to pressure it, a molding sticking intact to the external circumference of the mold can be inserted into or withdrawn from the jacket. Thus the operations before and after vulcanization are quite light.

BRIEF DESCRIPTION OF THE DRAWINGS

The invention will be better understood from the following detailed description taken in conjunction with the accompanying drawings, wherein.

DETAILED DESCRIPTION OF THE INVENTION

Figure 1:
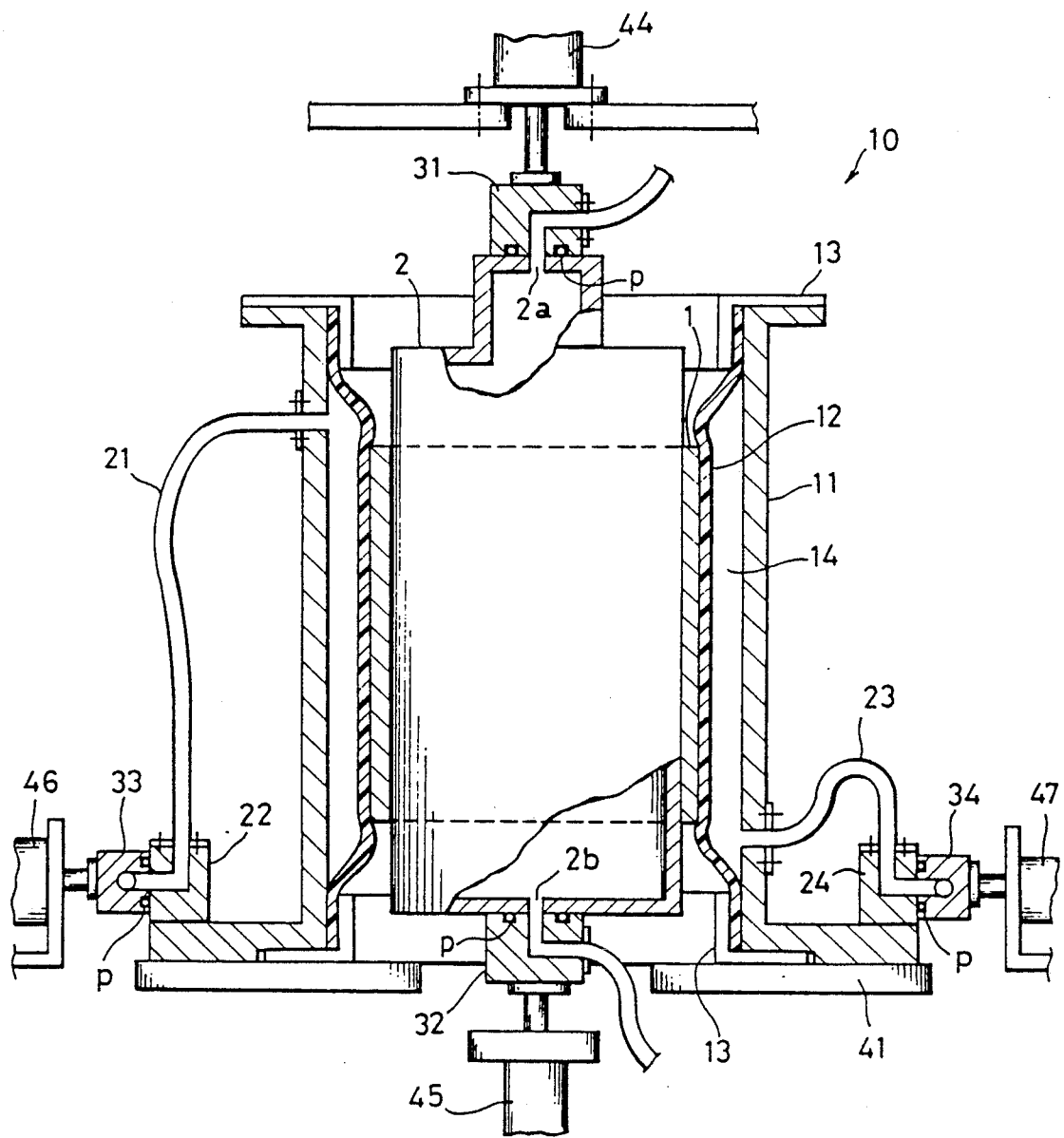
FIG. 1 is a longitudinal sectional view illustrating an apparatus in accordance with this invention during vulcanization.
Figure 2A:
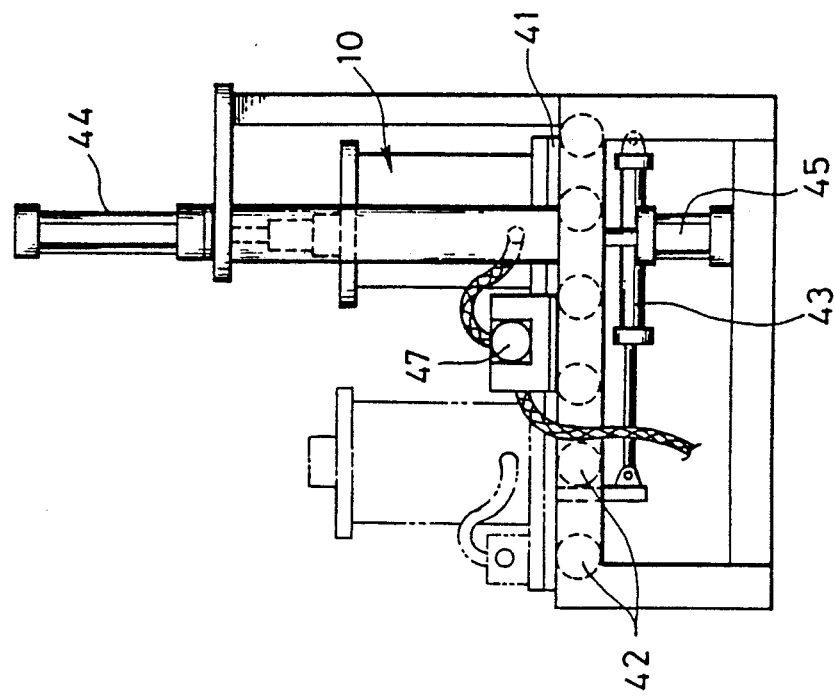
FIG. 2(a) and FIG. 2(b) are a front view and a side view illustrating the entire vulcanization apparatus.
Figure 2B:
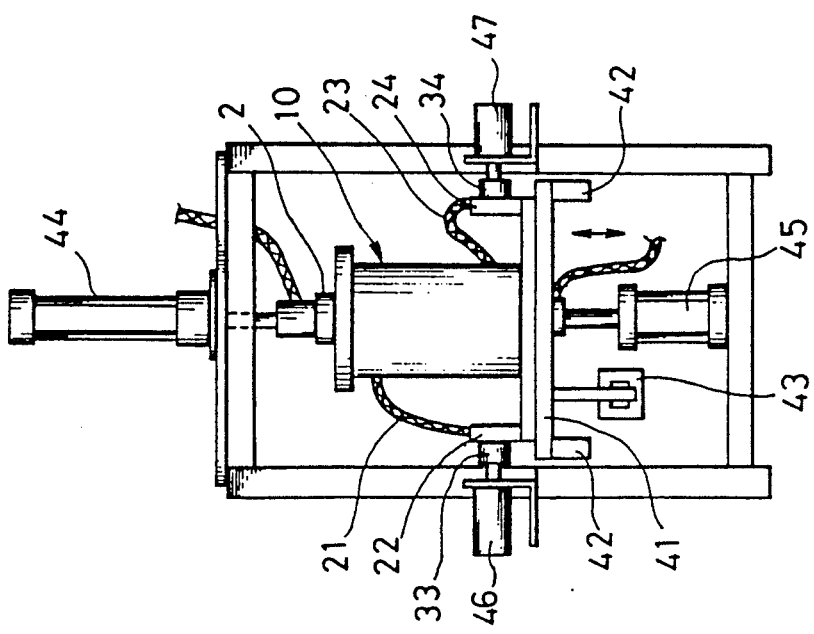
Figure 3:
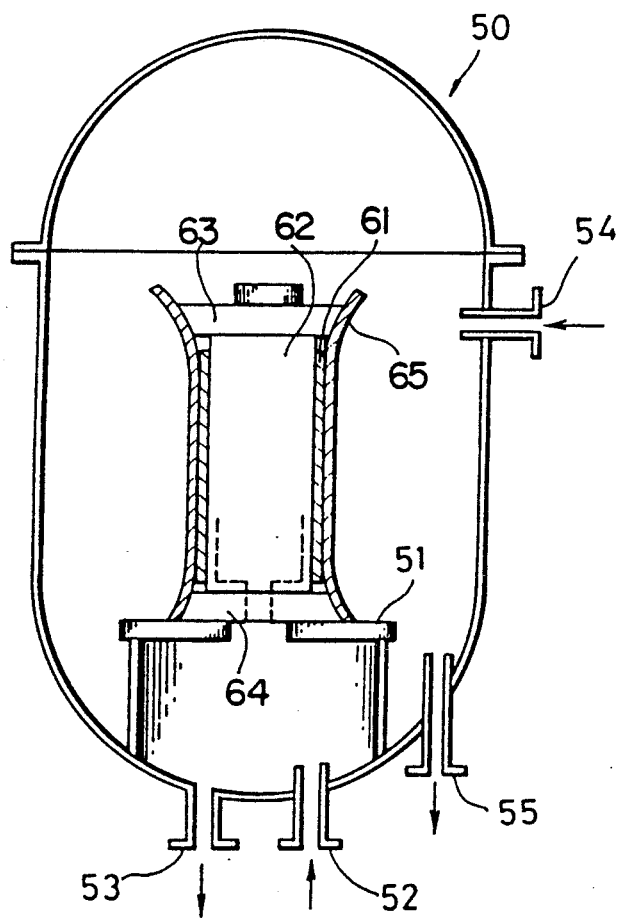
FIG. 3 is a longitudinal sectional view showing a conventional vulcanization apparatus.

With reference to FIG. 1, FIG. 2(a) and FIG. 2(b), the preferred embodiment of the vulcanization apparatus according to the present invention is described as follows.

The vulcanization apparatus is provided with a cylindrical steaming jacket 10. As shown FIG. 1, a molding 1 of rubber belt material (before being cut crosswise into the ring-shaped final products) is vulcanized while being kept intact over the external circumference of a hollow cylindrical mold 2 for molding.

The steaming jacket 10 is formed by mounting a rubber sleeve 12 on the interior of a cylindrical casing 11 and fixing and sealing the upper and lower axial ends of the rubber sleeve against the casing with annular compression members 13 so that steam can be passed through an annular space 14 between the casing 11 and the sleeve 12. A steam supply pipe 21 leading to a block joint 22, and a steam discharge pipe 23 leading to a block joint 24, are connected to the upper and lower ends of the space 14. Such jackets 10 may be provided in various sizes to suit different sizes of the molding 1 (and the mold 2). According to the size of a molding 1, a jacket is selected, having a size such that when the casing 11 and the sleeve 12 are in close contact with each other, the molding 1 and the mold 2 can be inserted into the jacket 10, and when the space 14 is pressurized to compress the sleeve 12 inwardly, the sleeve 12 is pressed against the outer surface of the molding 1 as shown in FIG. 1.

As illustrated in FIGS. 2(a) and 2(b), the vulcanization apparatus is provided with a travelling base 41 which is movable on rollers 42, and the travelling base 41 is reciprocated by a transfer pneumatic cylinder 43 connected to the underside of the base. The steaming jacket 10 is carried on the base 41 between a vulcanization position and a preparation position (shown in dash-dot-dot lines in FIG. 2(b). Pneumatic cylinders 44, 45, 46 and 47 are provided above, below, and on the left and right of the vulcanization position, and steaming blocks 31, 32, 33 and 34 are attached to the respective ends of the cylinders 44, 45, 46, and 47 as illustrated in FIG. 1. These steaming blocks are designed to pass steam to the mold 2 and the jacket 10 in the vulcanization position, and are connected to a steam generator (not illustrated) by means of hoses 21, 23. The blocks 31 and 32 are pressed against the upper and lower openings 2a and 2b of the mold 2 by the cylinders 44 and 45, respectively, to pass high temperature steam through the hollow of the mold 2. The blocks 33 and 34 are pressed against the joints 22 and 24 by the cylinders 46 and 47, respectively, to pass high temperature and high pressure steam through the jacket 10. The blocks 31 and 33 are on the steam supply sides, and the blocks 32 and 34 are on the steam discharge sides. The respective blocks 31, 32, 33 and 34 are provided with O rings p to assure sealing of the contact surface as illustrated in the diagram.

With the foregoing vulcanization apparatus, vulcanization of the molding is effected as follows:

(1) The molding 1 is placed over the external circumference of the mold 2. The mold 2 with the molding 1 sticking intact to the external circumference thereof is inserted into the jacket 10 which is mounted on the travelling base 41 in the preparation position (the position illustrated by the dash-dot-dot line of FIG. 2(b)).

(2) The transfer pneumatic cylinder 43 is actuated to carry the base 41, jacket 10, the mold 2 and the molding 1 in the state described in (1) above, on the travelling base 41, to the vulcanization position shown in full lines.

(3) The pneumatic cylinders 44, 46, 46 and 47 are then actuated to extend and connect the steam blocks 31, 32, 33, and 34 to the mold 2 and the joints 22 and 24 as explained above.

(4) Via the steam lines including the blocks 31 and 32 and the openings 2a and 2b, steam at about 170° C. is passed through the hollow interior of the mold 2. Via the steam line including the blocks 33 and 34, the joints 22 and 24, and the steam pipes 21 and 23, steam of about 170° C. and 11 kg/cm$^2$ is passed through the space 14 of the jacket 10. The pressure of the steam causes the rubber sleeve 12 to swell inwardly, and the molding 1 is pressed by the internal surface of the sleeve 12 (the state of FIG. 1) over the external circumference of the mold 2. Under this pressurized condition, the molding 1 is in direct contact with the mold 2 and the sleeve 12 and it is vulcanized by the heat of the steam transferred through the circumferential walls of the sleeve 12 and the mold 2.

(5) When vulcanization is completed, the flow of the steam is terminated, and the cylinders 44, 45, 46 and 47 are retracted to disconnect the joints of the blocks 31, 32, 33 and 34. Then the jacket 10, the mold 2 and the molding 1 are carried again to the preparation position by the transfer cylinder 43. The space 14 of the jacket 10 returns to the atmospheric pressure when the parts 22, 24 separate from the parts 33, 34, and the sleeve 12 shrinks to close contact with the casing 11. Thus the mold 2 and the molding 1 can be easily removed from the jacket 10 by, for example, lifting the mold 2 and the molding 1 upwardly with a hoist. Since the vulcanized molding 1 has an increased mechanical strength, it is also easy to remove the molding 1 from the mold 2. If the sleeve 12 continues to be swelled after the steam pressure is removed, a vacuum pump may be connected to the joints 22 and 24 to form a negative pressure (less than the atmospheric pressure) in the space 14.

(6) When the size of a molding 1 (and a mold 2) to be vulcanized next is different from the previous one, the jacket 10 is replaced with one of an appropriate size. If the positions of the joints 22 and 24 of all jackets 10 are made identical with each other, vulcanization can be made in the same machine and procedure as described above without any additional preparatory steps.

As will be clear from the above description, the vulcanization apparatus according to the present invention has the following advantages or effects:

1) Since the heating fluid such as steam does not contact the molding, the integrity of the fluid flow lines (such as the steam generator) and the molding are not impaired.

2) Quick vulcanization can be made with light work loads because of the following reasons: It is not necessary to remove the unvulcanized rubber molding from the mold; it is not necessary to put a rubber sleeve over the molding, etc.; the entire circumference can be vulcanized at once; insertion and removal of the molding before and after vulcanization can be made with ease; more than one mold of a given size may be provided so that a molding may be removed from a mold while another molding is being vulcanized; and the machine may be used with different size molds and moldings.

What is claimed is:

1. A vulcanization apparatus for vulcanizing a cylindrical rubber molding utilizing a heated fluid under pressure, comprising a cylindrical mold having a hollow interior, said mold being adapted to receive said molding over the external circumference thereof; a jacket comprising a tubular rubber sleeve mounted inside a cylindrical casing, both axial ends of said sleeve being secured and sealed to said casing, said jacket being dimensioned such that a molding and a mold can be inserted into said sleeve, an internal space between said casing and said sleeve being formed which when pressurized causes said sleeve to be swelled inwardly and the molding to be pressed by the inner circumference of said sleeve; first piping connected to said jacket to pass said fluid through said internal space; second piping connected to said mold to pass said fluid through said hollow interior, means for moving said jacket and said mold between a preparation position and a vulcanization position, and means for connecting said fluid to said jacket and to said mold when in said vulcanization position and disconnecting said fluid when in said preparation position.

2. Apparatus as set forth in claim 1, wherein said first piping includes a supply pipe and a drain pipe connected to said jacket, and said second piping includes a supply pipe and a drain pipe connected to said mold.

* * * * *